(12) United States Patent
Freedman et al.

(10) Patent No.: US 11,487,766 B2
(45) Date of Patent: Nov. 1, 2022

(54) OPERATION FRAGMENTATION WITH METADATA SERIALIZATION IN QUERY PROCESSING PUSHDOWNS

(71) Applicant: Microsoft Technology Licensing, LLC, Redmond, WA (US)

(72) Inventors: Craig S. Freedman, Sammamish, WA (US); Adrian-Leonard Radu, Sammamish, WA (US); Daniel G. Schall, Woodinville, WA (US); Hanumantha R. Kodavalla, Sammamish, WA (US); Panagiotis Antonopoulos, Redmond, WA (US); Raghavendra Thallam Kodandaramaih, Redmond, WA (US); Alejandro Hernandez Saenz, Kirkland, WA (US); Naveen Prakash, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/180,516

(22) Filed: Feb. 19, 2021

(65) Prior Publication Data
US 2022/0197911 A1    Jun. 23, 2022

Related U.S. Application Data

(60) Provisional application No. 63/127,821, filed on Dec. 18, 2020.

(51) Int. Cl.
*G06F 16/2457* (2019.01)
*G06F 16/2453* (2019.01)
(Continued)

(52) U.S. Cl.
CPC ...... *G06F 16/24573* (2019.01); *G06F 16/248* (2019.01); *G06F 16/24542* (2019.01); *G06F 16/24564* (2019.01); *G06F 16/284* (2019.01)

(58) Field of Classification Search
None
See application file for complete search history.

(56) References Cited

U.S. PATENT DOCUMENTS

| 6,341,302 B1 * | 1/2002 | Celis | G06F 9/546 |
| | | | 718/100 |
| 10,540,355 B1 * | 1/2020 | Agnich | G06F 16/25 |
| | | (Continued) | |

OTHER PUBLICATIONS

"International Search Report and Written Opinion Issued in PCT Application No. PCT/US21/058374", dated Feb. 28, 2022, 14 Pages.
(Continued)

*Primary Examiner* — Wilson Lee
(74) *Attorney, Agent, or Firm* — Fiala & Weaver P.L.L.C.

(57) ABSTRACT

Methods for operation fragmentation with metadata serialization in query processing pushdowns are performed by systems and devices. A compute node receives a query directed to database data, and generates query text fragments. Portions of metadata of the database are read from different page servers, and are serialized by the compute node. Page identities of data pages in a page server that stores the data are determined from a page index at the compute node, and the compute node provides the text fragments, the serialized metadata, and the page identities to the page server storing the data. The page server compiles the text fragments based on the serialized metadata to generate an executable query plan for the query. The page server initializes and performs execution of the executable query plan against the data as a pushdown query operation,
(Continued)

and a result of pushdown query operation is provided to the compute node.

20 Claims, 5 Drawing Sheets

(51) Int. Cl.
*G06F 16/28* (2019.01)
*G06F 16/248* (2019.01)
*G06F 16/2455* (2019.01)

(56) References Cited

U.S. PATENT DOCUMENTS

| | | | | |
|---|---|---|---|---|
| 11,055,352 | B1* | 7/2021 | Beitchman | G06F 16/90335 |
| 2007/0300217 | A1* | 12/2007 | Tunmer | G06F 8/38 |
| | | | | 717/177 |
| 2009/0094258 | A1 | 4/2009 | Chen et al. | |
| 2012/0005190 | A1* | 1/2012 | Faerber | G06F 16/24542 |
| | | | | 707/718 |
| 2012/0310991 | A1* | 12/2012 | Frantz | G06F 16/278 |
| | | | | 707/E17.011 |
| 2013/0124466 | A1* | 5/2013 | Naidu | G06F 16/27 |
| | | | | 707/610 |
| 2015/0088924 | A1* | 3/2015 | Abadi | G06F 16/90335 |
| | | | | 707/769 |
| 2016/0132502 | A1* | 5/2016 | Balasa Ramnath | |
| | | | | G06F 16/2272 |
| | | | | 707/689 |
| 2016/0274940 | A1* | 9/2016 | Birdsall | G06F 16/245 |
| 2018/0210922 | A1* | 7/2018 | Schulze | G06F 16/2453 |
| 2019/0392061 | A1 | 12/2019 | Terry et al. | |
| 2020/0050692 | A1 | 2/2020 | Antonopoulos et al. | |
| 2020/0117676 | A1* | 4/2020 | Ben Moshe | G06F 16/27 |
| 2020/0125751 | A1* | 4/2020 | Hariharasubrahmanian | |
| | | | | H04L 9/30 |
| 2020/0334374 | A1 | 10/2020 | Mandadi et al. | |
| 2021/0011967 | A1* | 1/2021 | Rathod | G06F 16/9535 |
| 2021/0034598 | A1* | 2/2021 | Arye | G06F 16/288 |
| 2022/0197892 | A1 | 6/2022 | Freedman et al. | |

OTHER PUBLICATIONS

"International Search Report and Written Opinion Issued in PCT Application No. PCT/US21/059418", dated Mar. 3, 2022, 12 Pages.

* cited by examiner

OPERATION FRAGMENTATION WITH METADATA SERIALIZATION IN QUERY PROCESSING PUSHDOWNS

CROSS-REFERENCE TO RELATED APPLICATION(S)

The present application claims priority to U.S. Provisional Patent Application No. 63/127,821, entitled "OPERATION FRAGMENTATION WITH METADATA SERIALIZATION IN QUERY PROCESSING PUSHDOWNS," and filed on Dec. 18, 2020, the entirety of which is incorporated by reference herein.

BACKGROUND

Large scale query processing systems can include one or more compute nodes that handle and process queries against databases having data in data pages stored and maintained by page servers. In current systems, compute nodes perform the processing operations based on data that is retrieved from the page servers, and this requires very high volumes of network traffic between the compute nodes and the page servers, and also causes very high processing and memory burdens on the compute nodes. These issues are compounded when databases are scaled out to larger sizes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for operation fragmentation with metadata serialization in query processing pushdowns are performed by systems and devices. Page servers perform pushdown operations based on specific, and specifically formatted or generated, information, instructions, and data provided thereto from a compute node. Pushdown operations are processing operations that would normally be performed by a compute node. A compute node receives a query directed to data in a database, maintained at or by page servers, from a user via user device or from other devices and systems. The compute node determines if the query includes operations that should be performed by pushing operations down to page servers. The compute node generates query text fragments from the received query, and portions of metadata of the database are read from different page servers by the compute node which serializes the metadata. Page identities of data pages at the page servers are determined from a page index at the compute node, and the compute node provides the text fragments, the serialized metadata, and the page identities to the page servers storing the data. The page servers compile the text fragments based on the serialized metadata to generate executable query plans for query operations that are pushed down. The page servers then initialize and executes the executable query plans against the data respectively maintained thereby as pushdown query operations, and results of the pushdown query operations are provided to the compute node.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1A:
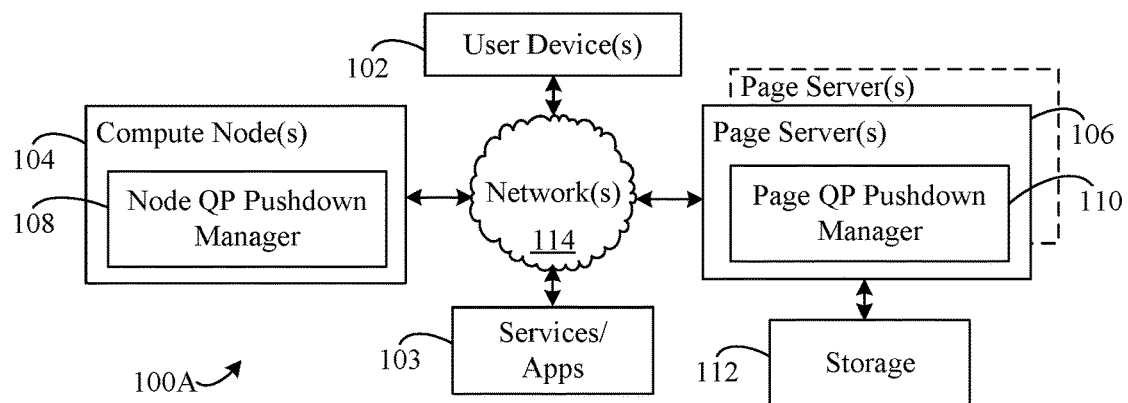
FIG. 1A shows a block diagram of a system for operation fragmentation with metadata serialization in query processing pushdowns, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for operation fragmentation with metadata serialization in query processing pushdowns. Section III below describes example computing device embodiments that may be used to implement features of the embodiments described herein. Section IV below describes additional examples and advantages, and Section V provides some concluding remarks.

II. Example Embodiments for Operation Fragmentation with Metadata Serialization in Query Processing Pushdowns Embodiments herein provide for operation fragmentation with metadata serialization in query processing pushdowns. One example implementation of these embodiments is a distributed processing system that performs query processing for large, scalable database operations. It should be noted, however, that these example implementations are not limiting, but rather, are illustrative in nature. In the context of distributed embodiments, a database/computing system includes several distributed components, including one or more compute nodes, multiple page servers, a log service, and storage. As an example, embodiments may be implemented in Azure® SQL Database from Microsoft Corporation of Redmond, Wash. The distributed architectures under the embodiments herein enable databases of large sizes, such as those exceeding 100 TB, to perform fast database restores, to perform near-instantaneous backups, and to rapidly scale up and down.

In existing distributed solutions, compute nodes handle all incoming user queries and query processing activities, where page servers provide a storage engine with each page server maintaining a set or subset of data pages for a database. The role of a page server in existing solutions is limited to serving pages out to compute nodes and to keeping data pages (also "pages" herein) up-to-date based on ongoing transaction activity.

However, in contrast to existing systems, embodiments herein enable page servers to perform pushdown operations for query processing that for which page servers were not previously capable. The methods and systems described herein allow for online transaction processing (OLTP) and hybrid transaction and analytical processing workloads (HTAP) that enables high throughput transaction systems that also require real-time analytics. This is accomplished according to the embodiments herein by improving system efficiencies and the handling of processing operations via pushdowns to page servers, as will be described in detail below.

For example, in OLTP-tuned systems, the embodiments herein are configured to operate in improved and efficient ways that match the performance characteristics of business critical systems, and for analytical workloads that are scan-intensive over very large data sets, the distributed nature and operations of the systems and methods herein does not disadvantage performance in comparison to existing business critical, single-system implementations that use locally-associated solid state drives for maintaining data, because embodiments provide for more efficient configurations and capabilities of the described distributed systems herein. That is, the described embodiments efficiently handle HTAP workloads by leveraging available page server(s) compute resources and minimizing remote input/output (I/O) data page movement within the computing system, which current solutions cannot do.

As an example, consider the following analytical query against a table of a database with 1.5B (billion) rows that cannot leverage existing indexes for a seek operation. This query is looking for the average stock sale for transaction commissions greater than $95.00:

SELECT AVG([T_TRADE_PRICE]*[T_QTY]) AS [Average Sale Amt]
FROM [dbo].[TRADE]
WHERE [T_COMM]>95.00;

Assuming there are 245,598 rows in the table where the commission is higher than $95.00, a typical processing system must have a selective filter that considers the overall size of the table. However, because T_COMM is not the leading column of an existing index, the compute node of the system must scan each row in the table to perform the query, according to prior solutions. For a large table, such as in this example, that requires scanning to process a query, the compute node must issue several requests for remote I/O data fulfillment from the page server(s) to the compute node. The required data pages are first loaded from the page server(s) into memory on the compute node which then must process the filter on each row. This means that page servers of the computing system that are associated with the table must provide a very large amount of data over the network that will consume correspondingly large amounts of memory at the compute node, as well as correspondingly large processing resources. In this example, for the 1.5B row table, approximately 30M (million) pages are retrieved by the page server(s), provided over the network to the compute node, and stored in memory of the compute node which then scans/filters all 1.5B rows in the provided 30M pages to complete the query operation.

In contrast to the performance of the query operation by prior solutions, the embodiments herein provide moving, e.g., the scan/filter operations to the page server(s), thus achieving a "pushed" or "pushdown" filter that provides a number of system benefits, including but not limited to, moving fewer data pages to the compute node from the page servers, reducing network traffic from the page servers to the compute node, reduce I/O requirements on the compute node, reduce memory and RBPEX ("resilient buffer pool extension") pressure that occurs flooding the compute node buffer cache, and improving the handling of concurrent OLTP workloads on the compute node by offloading or pushing-down processing of scan-intensive HTAP queries to the page server(s). Thus, taking the example filter/query from above, but in the context of the described embodiments, the page server(s) retrieve, scan, and filter the 1.5B rows of data from the 30M data pages, and in turn, only provide the 245,598 rows in the table to the compute node which can then simply aggregate the rows of data in cases where the rows are provided from different page servers.

Simply put, embodiments herein leverage spare processing capacity of the allocated page servers to apply filters and other perform other types of pushdown operations. In addition to the computing system performance improvements achieved, as noted above, the primary customer experience will also be improved greatly over prior solutions via query performance for analytical queries. While not so limited, examples of application for the described embodiments include workload types such as HTAP (e.g., a mix of OLTP and OLAP (online analytical processing)); large data sizes such as very large tables, including tables that exceed the capacity of the buffer cache maximum size for a compute node (which would otherwise result in many remote page server I/O operations); different issues related to page affinity for various data structures such as pushed operations against heaps, B-trees, and column store indexes, as well as detecting page splits by page servers during data page reads; eligible data operations such as row mode filters for non-sargable predicates and row mode bitmap filters, SELECT operation list expressions and row mode scalar aggregation pushdowns, and batch mode filters and aggregations.

Therefore, benefits from improved query performance for analytical queries against large data sets are realized by the described embodiments. Eligible queries return rows of data to the compute node(s) instead of full data pages, and thus reduce memory pressure (e.g., no data pages are pushed to buffer pool, as well as reduced memory pressure and evictions of existing pages). Several aspects of improvements provided by the embodiments herein, as noted above, are not to be considered limiting.

Operation fragmentation with metadata serialization in query processing pushdowns is described below as comprising a portion of the overall processes and benefits provided by the described embodiments. Methods for operation fragmentation with metadata serialization in query processing pushdowns are performed by systems and devices. Pushdown operations are processing operations that would normally be performed by a compute node. Page servers perform pushdown operations based on specific, and specifically formatted and/or generated, information, instructions, and data provided thereto from a compute node, as described herein. For example, when a compute node determines, in embodiments, that a received query against data of a database, or various operations/portions thereof, are candidates or are eligible to be pushed down to a page server for processing, the compute node generates text fragments of the received query and reads metadata associated with the database from page servers. The metadata read from the page servers is serialized, and is provided to one or more page servers, e.g., with page identifiers for data which the query/query portions are to be executed. In other words, because a single, given page server will not have all the metadata for a database that is needed to perform pushdown operations, the compute node reads the metadata from the page servers (assuming the data pages and/or metadata are not already cached on the compute node from other processes/operations), serializes the complete metadata needed for a pushdown operation, and sends the serialized metadata to the page server for the pushdown operation.

As noted, embodiments include constructing query plans (e.g., including query operators, expressions, etc.) to execute on page servers. A page server is configured to generate a query plan based on the text fragments, the serialized metadata, and the page identifiers, and then initialize and execute the query plan against the data to generate a query result, in accordance with embodiments herein. As there are often hundreds of objects and data structures that are created for query plans when a query is compiled, and that are involved in the execution of a query, the embodiments herein provide serialized metadata and query text fragments (e.g., text portions of a query) from the compute node to the pager server(s), and allow normal query compilation code at the page server(s) to generate query plans, rather than serializing and providing already-generated query plans and/or large numbers of the objects that comprise query plans or otherwise manually constructing the query plans.

Metadata is relational data from tables of databases, rather than objects, which describes the data in the database and changes relatively infrequently. When metadata does change, it is usually changed to add support for new features of database software. It should be noted herein that differences exist between changing the "schema" of the metadata (i.e., how it is stored) and running a data definition language DDL operation (e.g., CREATE, ALTER, DROP) on the database which makes changes to the metadata but not to the "schema" of the metadata. As schema changes are rare and infrequent, while changes to metadata via DDL operations is more common, embodiments herein leverage the consistency of the schema. Accordingly, new metadata is not needed if the new features are not supported by or related to query pushdown operations, or used on the page servers. Thus, the techniques described herein leverage the ability to serialize relational data associated with tables for provision to page servers, and the risk of missing requisite metadata is very low.

The embodiments herein also provide for a page server to be enabled to generate query plans, as described herein, even if the page server is running different code versions of database software than the compute node because query text is not impacted by changes to data structures that frequently occur during upgrades, therefore, the compute node and page servers need not be on the same version, and no special upgrade steps are needed to ensure that pushdown works across different versions. Moreover, this allows for independent upgrades to either compute nodes and/or page servers as needed on a system-by-system or implementation-by-implementation basis. And because a compute node cannot ask a page server to run a pushdown operation that the page server does not yet understand, when a compute node is upgraded before a page server, the usage of any new features may be delayed, in embodiments, until the upgrade is applied to the entire system (e.g., via a "two-phase upgrade" where a first phase upgrades the code globally, and second phase starts using the new features or code). Yet, the original query text and even the metadata continues to work with both old and new code which allows for less complex upgrades of this type.

In embodiments, page servers are also configured to determine that page splits have occurred during the reading of data pages maintained by the page servers during pushdown operations, as well as during fulfillment of compute node data requests, and compute nodes and page servers are also configured to store and maintain off-row data generated during data operations utilizing page affinity considerations where the off-row data is stored at the same page server as the data in the operations which allows a single page server to successfully read and/or provide data associated with an operation without failing back to the compute node.

Embodiments herein are described in the context of query processing and query processing pushdowns as non-limiting and exemplarily illustrative examples, including various types of operations performed in association with query processing and query processing pushdowns, such as operation fragmentation with metadata serialization. However, embodiments herein are not so limited, and their principles and functions are applicable to other types of processing task, applications, and/or services, in which offloading of operations from a primary computing system may be advantageously implemented.

Accordingly, methods for operation fragmentation with metadata serialization in query processing pushdowns are performed by systems and devices. The embodiments herein provide solutions that improve processing loads and efficiency in systems of compute nodes and page servers, reduces memory pressure at compute nodes, and greatly reduce network bandwidth usage between compute nodes and page servers. These and other embodiments for operation fragmentation with metadata serialization in query processing pushdowns will be described in further detail below in association with the Figures, and in the Sections/Subsections that follow.

Figure 1B:
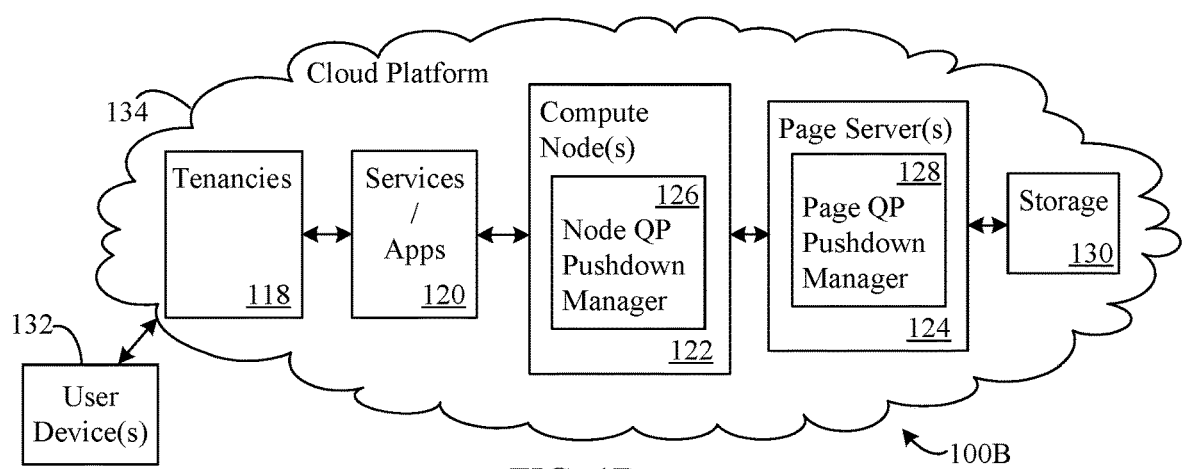
FIG. 1B shows a block diagram of a cloud-based system for operation fragmentation with metadata serialization in query processing pushdowns, according to an example embodiment.

Systems, devices, and apparatuses may be configured in various ways operation fragmentation with metadata serialization in query processing pushdowns. For instance, FIG. 1A and FIG. 1B will now be described. FIG. 1A shows a block diagram of a system 100A, and FIG. 1B shows a block diagram of a cloud-based system 100B, each configured for operation fragmentation with metadata serialization in query processing pushdowns, according to embodiments.

As shown in FIG. 1A, system 100A includes user device(s) 102 (also user device 102 herein), services/applications host 103, a compute node(s) 104, and a page server(s) 106. In embodiments, user device 102, services/applications host 103, compute node(s) 104, and page server(s) 106 communicate with each other over a network 114. A storage 112 is also shown in communication with page server(s) 106. It should be noted that in various embodiments, different numbers of user devices, hosts, compute nodes, page servers, and/or storages are present. Additionally, according to embodiments, any combination of the systems and/or components illustrated in FIG. 1A are present in system 100A.

Network 114 comprises different numbers and/or types of communication links that connect computing devices and hosts/servers such as, but not limited to, the Internet, wired or wireless networks and portions thereof, point-to-point connections, local area networks, enterprise networks, cloud networks/platforms, and/or the like, in embodiments. In an example, network 114 may be a cloud-based platform network and/or enterprise network through which a user device or other computing system connects to or accesses a service/application that may in turn cause performance of operations by compute nodes and page servers on data persisted in a data storage.

Storage 112 may be any type and/or number of data storage devices or systems, and may comprise internal and/or external storage in various embodiments. While storage 112 is shown in communication with page server(s) 106, in some embodiments, storage 112 may be connected to network 114, or may comprise a portion of page server(s) 106. Storage 112 may comprise a monolithic storage device/system, a cloud-based storage system, a distributed storage system, and/or the like.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for operation fragmentation with metadata serialization in query processing pushdowns, e.g., providing queries to a database (DB) server of services/applications host 103, as well as for performing client-side functions/operations of client-server scenarios. User device 102 also includes additional components (not shown for brevity and illustrative clarity) including, but not limited to, components and subcomponents of other devices and/or systems herein, in various embodiments. User device 102 may, in embodiments, represent other types of computing systems/devices the provide queries to a database.

User device 102 may be a computing device associated with a domain which, as used herein, generally refers to a physical and/or logical system boundary under the control of an entity within which applications and/or services are hosted, offered, managed, and/or otherwise implemented, and also encompasses subdomains and/or the like in embodiments. Exemplary, non-limiting domains include, without limitation, web domains, tenancies of hosted cloud platforms, cloud service providers, enterprise systems, and/or any other type of network or system. A tenant is particular type of domain that is a representation of an organization in a cloud platform. The domain of the tenant in the cloud platform is its tenancy in which the tenant registers and manages applications, stores data/files, accesses services, etc.

Services/applications host 103 comprises one or more server computers or computing devices, such as an on-premises server(s) in addition to, or in lieu of, cloud-based servers. Services/applications host 103 may host one or more services or applications, as would be understood by persons of skill in the relevant art(s) having the benefit of this disclosure, and may act as a portal or interface for users/tenants using user device(s) 102 by which access to compute node(s) 104 is obtained. In some embodiments, services/applications host 103 may host a DB server front end that utilizes compute node(s) 104 and page server(s) 106 as a back end.

Compute node(s) 104 comprises one or more server computers or computing devices, such as an on-premises server(s) in addition to, or in lieu of, cloud-based servers. Compute node(s) 104, as shown, include anode query processing (QP) pushdown manager 108. Node QP pushdown manager 108 is configured to determine and provide modified operations, operation fragments, modified and/or serialized metadata, page indexes associated with data pages for operations, and/or the like in the context of QP pushdowns to page server(s) 106. As an example, node QP pushdown manager 108 is configured to determine portions of received queries as being eligible for pushdown operations, generate query text fragments from the received queries, serialize metadata of a database, identify data pages for the query portions, and provide query text fragments, serialized metadata, and page identifiers to a page server that maintains the data pages. Node QP pushdown manager 108 may also be configured to receive data, from data pages managed by page server(s) 106, and in embodiments, some such data may be processed by page server(s) 106 based on QP pushdown requests provided to page server(s) 106 from node QP pushdown manager 108, as described herein. In such embodiments, node QP pushdown manager 108 provides the processed data/query results to a query processor or operations processor of compute node(s) 104 (described in further detail below) for performing QP operations at compute node(s) 104.

Page server(s) 106 comprises one or more server computers or computing devices, such as an on-premises server(s) in addition to, or in lieu of, cloud-based servers. Page server(s) 106, as shown, include a page query processing (QP) pushdown manager 110. Page QP pushdown manager 110 is configured to receive the query text fragments, serialized metadata, and page identifiers from compute node(s) 104, generate a compiled query plan based thereon, and initialize/execute the compiled query plan against the data. Page QP pushdown manager 110 may also be configured to detect page splits in data pages during performance of operations, such as when reading data from data pages, e.g., in the context of performing query pushdown operations, and to continue performance of such operations on new data pages generated by page splits after existing data pages are read based at least on comparisons of page indexes maintained and provided by compute node(s) 104 and next page identifiers in data pages at page server(s) 106.

It should also be noted that embodiments herein contemplate that compute node(s) 104, page server(s) 106, storage 112, and/or services/applications host 103 may comprise a portion of an enterprise network portion of network(s) 114 with which user device(s) 102 communicate over the Internet.

Turning now to FIG. 1B, system 100B is a cloud-based embodiment of system 100A of FIG. 1A. As shown, system 100B includes a cloud platform 134. In embodiments, cloud platform 134 is a cloud-based platform such as Microsoft® Azure® from Microsoft Corporation of Redmond, Wash., that is accessible by one or more users of user device(s) 132 (also user device 132 herein) over a network (not shown here for illustrative clarity and brevity).

User device 132 may be any type and/or number of user device, such as devices similar to those described for user device 102 in FIG. 1A, and may correspond to tenants and/or end users, IT personnel, administrators of systems described herein, of different domains, such as different tenancies within cloud platform 134.

A tenant in the context of FIG. 1B is a representation of an organization in a cloud platform. The domain of the tenant in the cloud platform is its tenancy in which the tenant registers and manages applications, stores data/files, accesses services, etc., hosted by cloud platform 134. Cloud platform 134 is illustrated as hosting tenancies 118 which comprises one or more tenants. Tenants are enabled to provide applications/services, hosted by cloud platform 134, to users such as end users of tenancies 118. In doing so, a tenant may lease or purchase the use of system resources within cloud platform 134 for such hosting and may utilized system resources and/or operations for providing their services to end users.

For instance, cloud platform 134 may host a tenant of tenancies 118 (which may include partners and/or service providers of the owner of cloud platform 118), that provides services for a DB server of services/applications 120 (also "services/apps" 120 herein) of cloud platform 134, in embodiments. Users of user device(s) 132 having credentials for ones of tenancies 118 are allowed to authenticate for this tenancy and access data, information, services, applications, etc., e.g., services/apps 120 of cloud platform 134, allowed or instantiated for the tenant.

Compute node(s) 122 and node QP pushdown manager 126 may be respective embodiments of compute node(s) 104 and node QP pushdown manager 108 of FIG. 1A, in the context of cloud platform 134. Page server(s) 124 and page QP pushdown manager 128 may be respective embodiments of page server(s) 106 and page QP pushdown manager 110 of FIG. 1A, in the context of cloud platform 134. Storage 130 may be an embodiment of storage 112 of FIG. 1A, in the context of cloud platform 134.

Cloud platform 134 includes one or more distributed or "cloud-based" servers, in embodiments. That is, cloud platform 134 is a network, or "cloud," implementation for applications and/or services in a network architecture/cloud platform. A cloud platform includes a networked set of computing resources, including servers, routers, etc., that are configurable, shareable, provide data security, and are accessible over a network such as the Internet, according to embodiments. Cloud applications/services are configured to run on these computing resources, often atop operating systems that run on the resources, for entities that access the applications/services, locally and/or over the network. A cloud platform such as cloud platform 134 is configured to support multi-tenancy as noted above, where cloud platform-based software services multiple tenants, with each tenant including one or more users who share common access to certain software services and applications of cloud platform 134, as noted herein. Furthermore, a cloud platform is configured to support hypervisors implemented as hardware, software, and/or firmware that run virtual machines (emulated computer systems, including operating systems) for tenants. A hypervisor presents a virtual operating platform for tenants.

Figure 8:
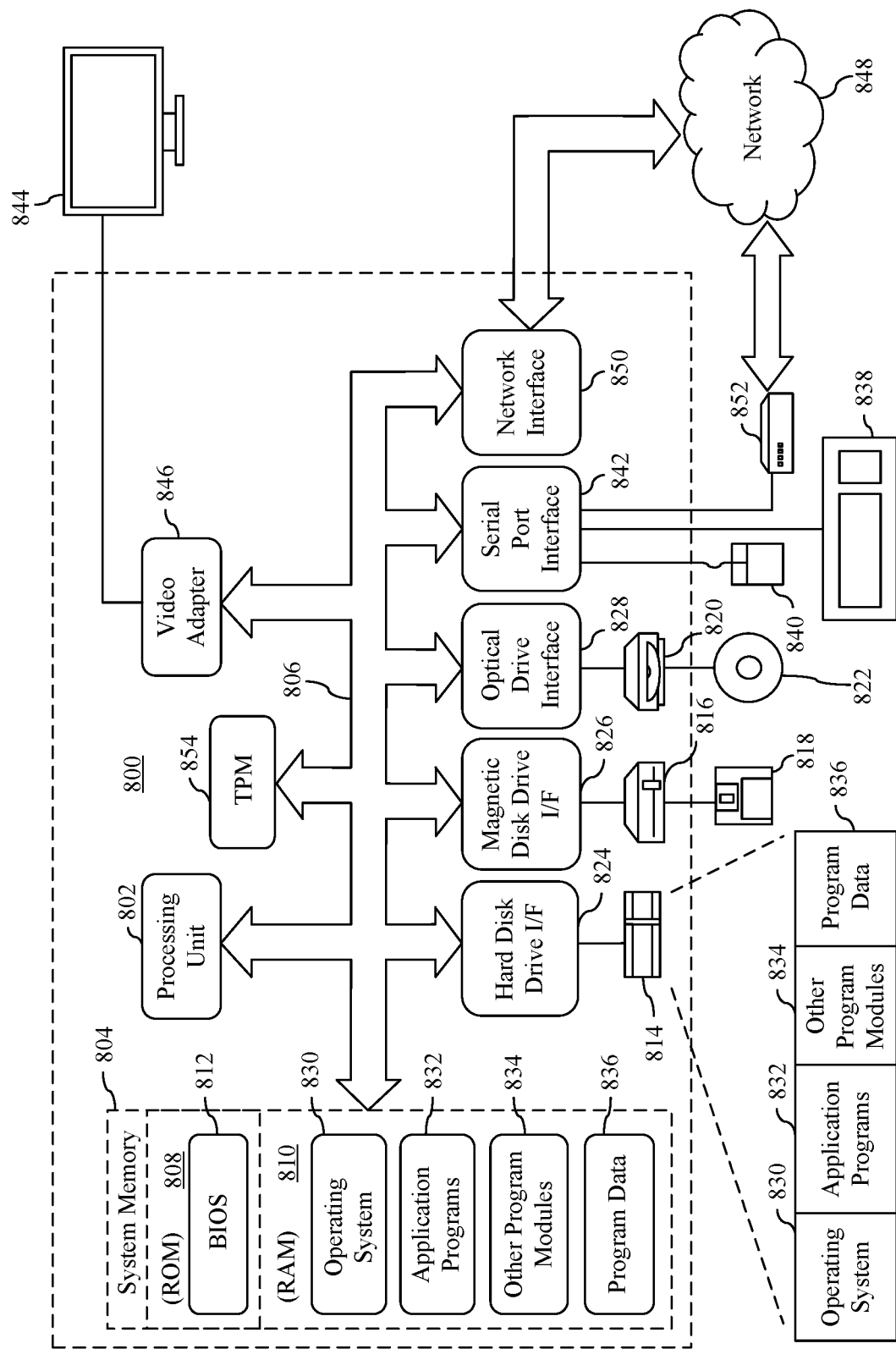
FIG. 8 shows a block diagram of an example computing device that may be used to implement embodiments.

Portions of FIGS. 1A and 1B, and system 100A and system 100B respectively, such as compute node(s) 104 and/or 122, page server(s) 106 and/or 124, storage 112 and/or 130, and/or cloud platform 134 also include additional components (not shown for brevity and illustrative clarity) including, but not limited to, components and sub-components of other devices and/or systems herein, e.g., an operating system, as shown in FIG. 8 described below, in embodiments.

Additionally, as would be understood by persons of skill in the relevant art(s) having the benefit of this disclosure, system 100A and system 100B illustrate embodiments in which system resources utilized for applications and/or services, such as DB server hosting, may be scaled out on demand or as needed to any size, throughput, capacity, etc., and the embodiments herein provide for the pushdown of operations to page servers that were up until now performed exclusively by compute nodes, and also provide for specific handling of different operations and functions by compute nodes and/or page servers to successfully and accurately perform these pushdown operations. Non-limiting examples of such specific handling include, without limitation, operation fragmentation with metadata serialization in query processing pushdowns, page split detection during reads of data pages, and/or the like as described herein.

Systems, devices, and apparatuses are configured in various ways for operation fragmentation with metadata serialization in query processing pushdowns, in embodiments. For instance, FIGS. 2 and 3 will now be described in this context.

Figure 2:
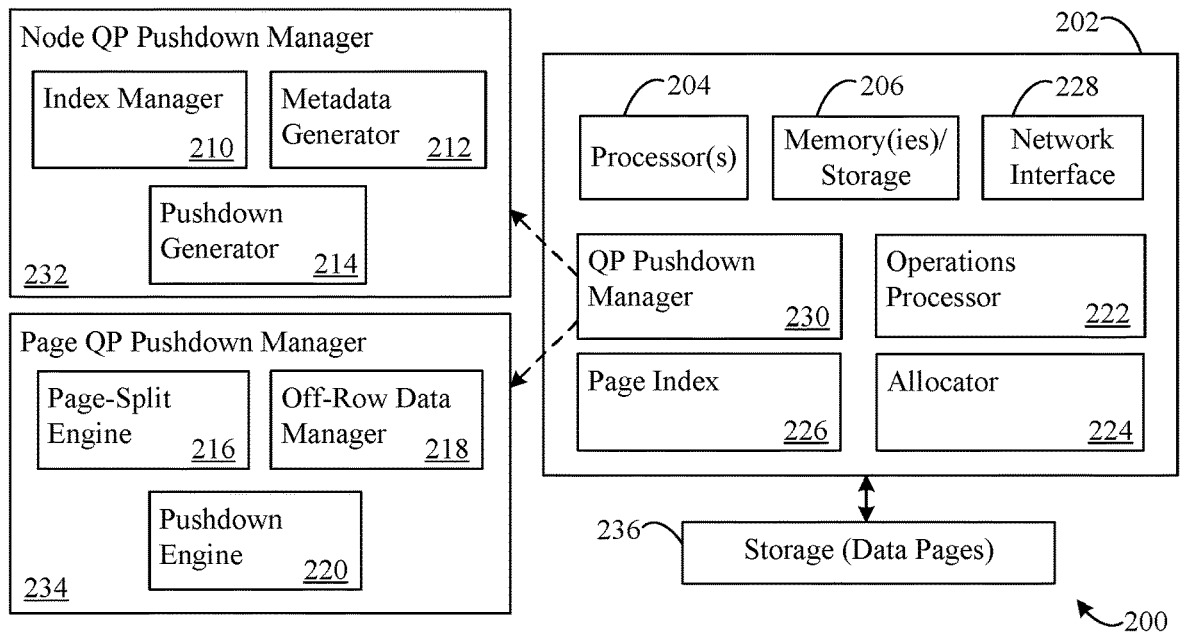
FIG. 2 shows a block diagram of a computing system configured for operation fragmentation with metadata serialization in query processing pushdowns, according to an example embodiment.
Figure 3:
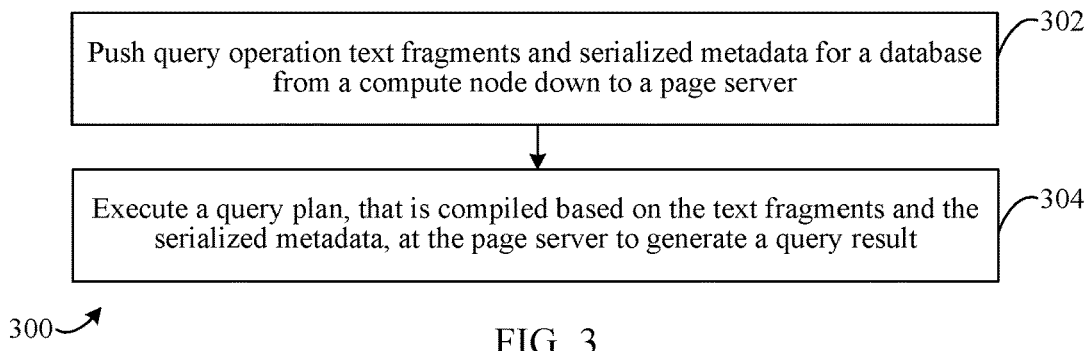
FIG. 3 shows a flowchart for operation fragmentation with metadata serialization in query processing pushdowns, in accordance with an example embodiment.

Referring first to FIG. 2, a block diagram of a system 200 is shown for operation fragmentation with metadata serialization in query processing pushdowns, according to an example embodiment. System 200 as exemplarily illustrated and described is configured to be an embodiment of system 100A of FIG. 1A and/or system 100B of FIG. 1B. FIG. 3 shows a flowchart 300 for operation fragmentation with metadata serialization in query processing pushdowns, according to an example embodiment. System 200 may be configured to operate in accordance with flowchart 300. System 200 is described as follows.

System 200 includes a computing system 202 which is any type of server or computing system, as mentioned elsewhere herein, or as otherwise known, including without limitation cloud-based systems, on-premises servers, distributed network architectures, and/or the like, and may be configured as a compute node and/or as a page server, in various examples as described herein. As shown in FIG. 2, computing system 202 includes one or more processors ("processor") 204, one or more of a memory and/or other physical storage device ("memory") 206, as well as one or more network interfaces ("network interface") 228. In embodiments, computing system 202 also includes a query processing (QP) pushdown manager 238 that is an embodiment of one or more of node QP pushdown manager 108 of FIG. 1A, node QP pushdown manager 126 of FIG. 1B, page QP pushdown manager 110 of FIG. 1A, and/or page QP pushdown manager 128 of FIG. 1B. Computing system 202 may also include an operations processor 222, an allocator 224, and one or more page indexes 226. System 200 includes a storage 236 that includes data pages, or portions thereof, in embodiments, and may be configured as, or similarly as, storage 112 of FIG. 1A and/or storage 130 of FIG. 1B.

It is contemplated herein that any components of system 200 may be grouped, combined, separated, etc., from any other components in various embodiments, and that the illustrated example of system 200 in FIG. 2 is non-limiting in its configuration and/or numbers of components, as well as the exemplary arrangement thereof.

Processor 204 and memory 206 may respectively be any type of processor circuit(s)/system(s) and memory that is described herein, and/or as would be understood by a person of skill in the relevant art(s) having the benefit of this disclosure. Processor 204 and memory 206 may each respectively comprise one or more processors or memories, different types of processors or memories (e.g., one or more types/numbers of caches for query processing, allocations for data storage, etc.), remote processors or memories, and/or distributed processors or memories. Processor 204 may be multi-core processors configured to execute more than one processing thread concurrently. Processor 204 may comprise circuitry that is configured to execute and/or process computer program instructions such as, but not limited to, embodiments of QP pushdown manager 230, including one or more of the components thereof as described herein, which may be implemented as computer program instructions, as described herein. For example, in performance of/operation for flowchart 300 of FIG. 3, processor 204 may execute program instructions as described. Operations processor 222 may be a query processor or a portion of a DB server, in embodiments, configured to perform DB operations such as performing queries against a DB. Operations processor 222 may comprise program instructions that are carried out by processor 204, in embodiments, or may be a hardware-based processing device as described herein.

Memory 206 includes volatile storage portions such as a random access memory (RAM) and/or persistent storage portions such as hard drives, non-volatile RAM, and/or the like, to store or be configured to store computer program instructions/code for operation fragmentation with metadata serialization in query processing pushdowns, as described herein, as well as to store other information and data described in this disclosure including, without limitation, embodiments of QP pushdown manager 230, including one or more of the components thereof as described herein, and/or the like, in different implementations contemplated herein. Memory 206 also includes storage of page index(es) 226, which includes an index of data pages associated with databases that identifies parent and leaf data page structures as well as page servers that maintain particular data pages, in embodiments, allocation caches, as well as data utilized and/or generated in performance of operations/functions noted herein, and/or the like, such as metadata, etc. In the context of a compute node, page index 226 may include information regarding each of the page servers associated with maintaining data pages of the DB, while in the context of a page server, page index 226 may include information regarding the data pages of the DB maintained by the page server.

Allocator 224 is configured to manage allocation of storage space for new data pages and associated page index modifications, as well as for off-row data, to improve page affinity for related data and performance of QP pushdown operations. As noted above, memory 206 includes one or more allocation caches in embodiments that are allocated to store persistent version store pages having data/information associated with different versions of a DB, as well as other data such as other off-row data. Allocator 224 is configured to manage allocation caches and the storage of data therein, and may include sub-units for management of persistent version store (PVS) data pages, small large object (SLOB) pages (e.g., secondary page overflow), unordered collections of rows such as heap forwarded rows, and new data pages and associated page index modifications.

Storage 236 may comprise a portion of memory 206, and may be internal and/or external storage or any type, such as those disclosed herein. In embodiments, storage 236 stores one or more data pages that comprise a DB object or DB file. When configured to function as a page server, system 200 stores any number of data pages in storage 236. Additionally, more than one page server may be implemented via multiple instances of system 200, and data pages of a DB object or DB file may be large enough in number and/or data size such that data pages of a single DB object or DB file span multiple instances of storage 236 across multiple, respective page servers. In embodiments where system 200 is configured to function as a compute node, storage 236 stores data pages and/or portions of data pages provided from one or more pages servers responsive to requests from the compute node. In embodiments, storage 236 may also include allocation caches as described herein.

Network interface 228 may be any type or number of wired and/or wireless network adapter, modem, etc., configured to enable system 200, including computing system 202, to communicate intra-system with components thereof, as well as with other devices and/or systems over a network, such as communications between computing system 202 and other devices, systems, hosts, of system 100A in FIG.

1A and/or system 100B in FIG. 1B, over a network/cloud platform such as network 112 and/or cloud platform 134.

System 200 also includes additional components (not shown for brevity and illustrative clarity) including, but not limited to, components and subcomponents of other devices and/or systems herein, as well as those described below with respect to FIG. 8, e.g., an operating system, etc., according to embodiments.

In embodiments, computing system 202 may be configured as a compute node and/or as a page server, and QP pushdown manager 230 of computing system 202 may be corresponding configured in such embodiments. That is, QP pushdown manager 230 may be configured as a node QP pushdown manager and/or as a page QP pushdown manager. Accordingly, QP pushdown manager 230 may be implemented in various ways to include a plurality of components for performing the functions and operations described herein for operation fragmentation with metadata serialization in query processing pushdowns, in a compute node context and/or in a page server context.

As illustrated, system 200 of FIG. 2 shows two non-exclusive options for configuring QP pushdown manager 230: a node QP pushdown manager 232 and a page QP pushdown manager 234. Node QP pushdown manager 232 includes, without limitation, an index manager 210, a metadata generator 212, and a pushdown generator 214. Page QP pushdown manager 234 includes, without limitation, a page split engine 216, an off-row data manager 218, and a pushdown engine 220, although additional components, as described herein or otherwise, are also included and some components may be excluded, in various embodiments. Additionally, features described for compute nodes may be included in page server embodiments, and vice versa.

Referring to node QP pushdown manager 232, index manager 210 is configured to determine indexes of data pages required for QP and/or QP pushdown operations based on page index 226. In embodiments, this may include page identifiers and next data pages associated with data pages to be read by, or operated on by, a page server. Metadata generator 212 is configured to serialize metadata required for operations as provided to a page server. Metadata generator 212 may also be configured to determine metadata needed for, and to generate versions of metadata and/or modify metadata associated with a DB for, performing different operations described herein such as QP pushdown operations to be performed by a page server. In embodiments, pushdown generator 214 is configured to generate pushdown operations at a compute node for provision to a page sever. This may include, without limitation, generating query text fragments (e.g., including query operators, expressions, etc.) from received queries that, along with page identifiers and appropriate metadata, e.g., serialized metadata, are provided to, and assembled to form query plans for QP pushdown operations performed by, one or more page servers that would otherwise be incapable of performing the required QP pushdown operations.

Referring now to page QP pushdown manager 234, page-split engine 216 is configured to determine when a page split has occurred at a page server during a reading of the data page that was split. In embodiments, page-split engine 216 determines page splits based on a comparison between an expected next data page from page index 226 and a provided next data page from a compute node. Off-row data manager 218 is configured to determine that off-row data is generated in association with an operation on data from a data page, and to determine a storage location for the generated off-row data that provides page affinity with the data and/or other off-row data associated with the data. Pushdown engine 220 is configured to generate QP pushdown operations, from information provided by a compute node, such that operations processor 222 is enabled to process the operations. In embodiments, to do this, pushdown engine 220 may be configured to compile query text fragments received from a compute node, and based on serialized metadata and page identifiers, into an executable query plan, and then provide the query plan to operations processor 222 for execution against data in a database. In embodiments, pushdown engine 220 may comprise a portion of operations processor 222.

Referring also now to FIG. 3, flowchart 300 begins with step 302. In step 302, query operation text fragments and serialized metadata for a database are pushed from a compute node down to a page server. For example, referring again to node QP pushdown manager 232 of system 200 in FIG. 2, as similarly described above, index manager 210 provides identifiers of data pages against which query operations are performed, metadata generator 212 serialized database metadata read from page servers of the system, and pushdown generator 214 generates text fragments of a received query, which are pushed down from a compute node to a page server.

Flowchart 300 of FIG. 3 continues with step 304. In step 304, a query plan, that is compiled based on the text fragments and the serialized metadata, is executed at the page server to generate a query result. For instance, referring to page QP pushdown manager 234 of system 200 in FIG. 2, pushdown engine 220 is configured to compile an executable query plan that corresponds to the query text fragments received from step 304 based on the serialized metadata and the page identifiers. The query plan compiled is then initialized and executed by operations processor 222 of system 200, according to embodiments. Results from executing the query plan are then provided to the compute node that pushed the query text fragments down in step 302.

Accordingly, the embodiments herein provide for operation fragmentation with metadata serialization performed by a compute node in query processing pushdowns compiled and executed at a page server to be enabled, when otherwise, a page server could not perform such operations. The systems and devices herein are enabled to perform the described pushdown operations based on specific, and specifically formatted/generated, information, instructions, and data provided thereto from a compute node, e.g., generated query text fragments, serialized metadata, page identifiers, and/or the like. Such embodiments thus utilize spare processing resources of page servers to unburden compute node resources while at the same time reduce large amounts of network traffic from multiple I/O calls by a compute node that.

As noted above for FIGS. 1A, 1B, 2, and 3, embodiments herein provide for operation fragmentation with metadata serialization in query processing pushdowns. System 100A of FIG. 1A, system 100B of FIG. 1B, and/or system 200 of FIG. 2 may be configured to perform functions and operations for such embodiments. It is further contemplated that the systems and components described above are configurable to be combined in any way. FIG. 4, FIG. 5A, FIG. 5B, and FIG. 6 will now be described.

Figure 4:
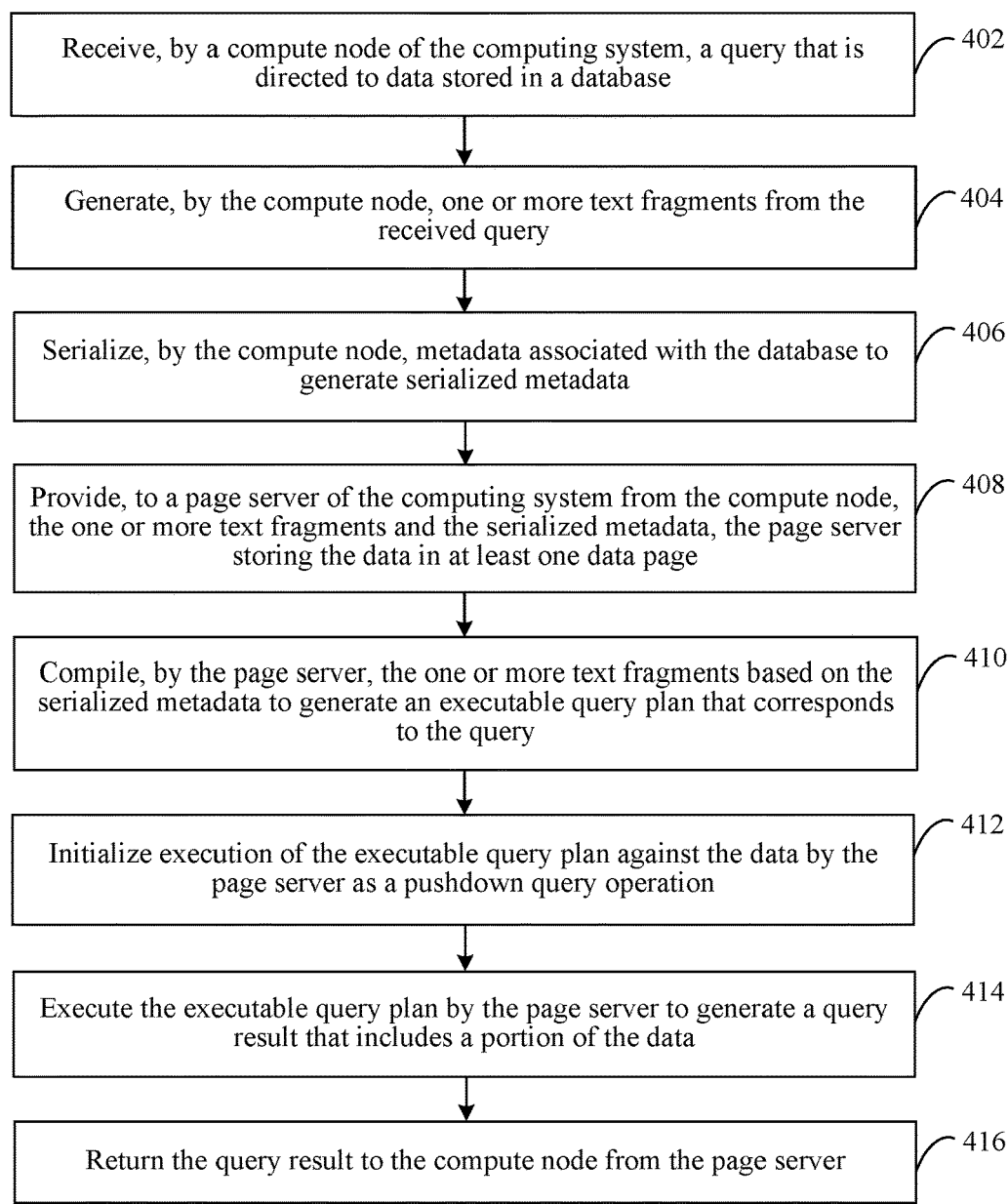
FIG. 4 shows a flowchart for operation fragmentation with metadata serialization in query processing pushdowns, in accordance with an example embodiment.

FIG. 4 shows a flowchart 400 for operation fragmentation with metadata serialization in query processing pushdowns, according to example embodiments. System 100A in FIG. 1A, system 100B in FIG. 1B, and/or system 200 in FIG. 2 are configured to operate according to flowchart 400, which may be an embodiment of flowchart 300 of FIG. 3. Further structural and operational examples will be apparent to persons skilled in the relevant art(s) based on the following descriptions. Flowchart 400 is described below in the context of system 100B in FIG. 1B and system 200 of FIG. 2, and with respect to FIG. 5A, FIG. 5B, and FIG. 6. It should be understood, however, the following description is also applicable to system 100A in FIG. 1A.

Figure 5A:
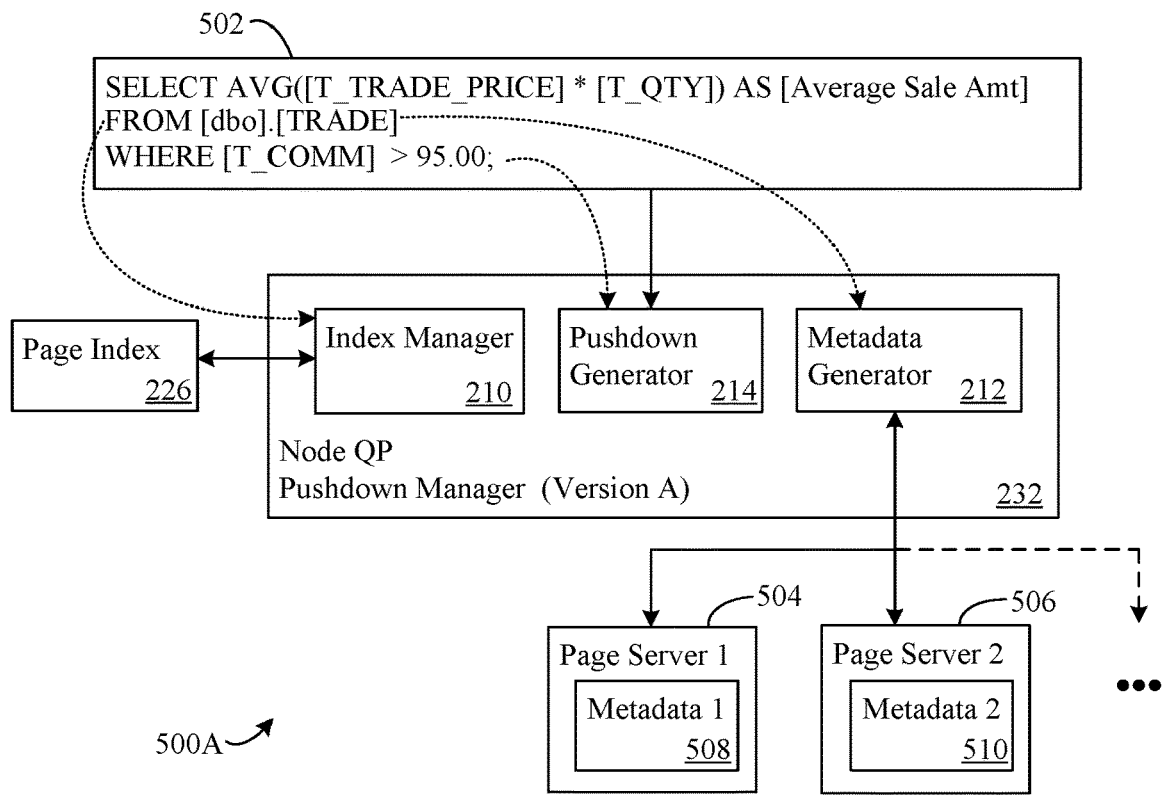
FIG. 5A and FIG. 5B show block diagram representations of operation fragmentation with metadata serialization in query processing pushdowns, in accordance with an example embodiment.
Figure 5B:
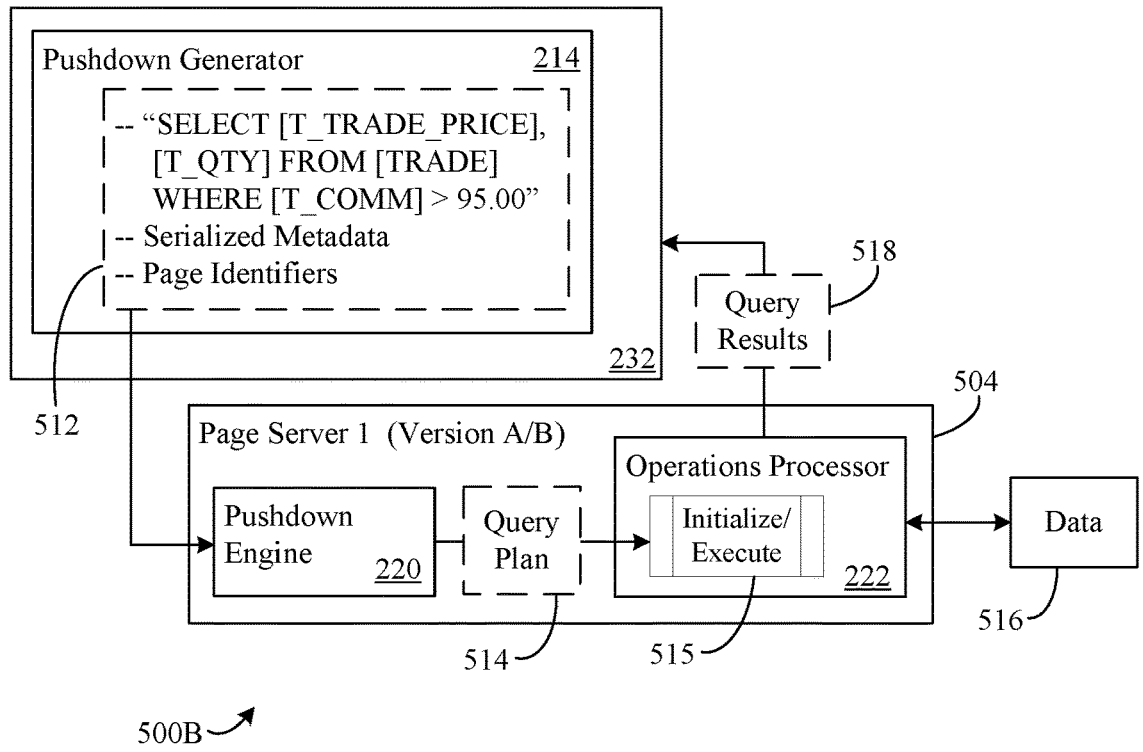
Figure 6:
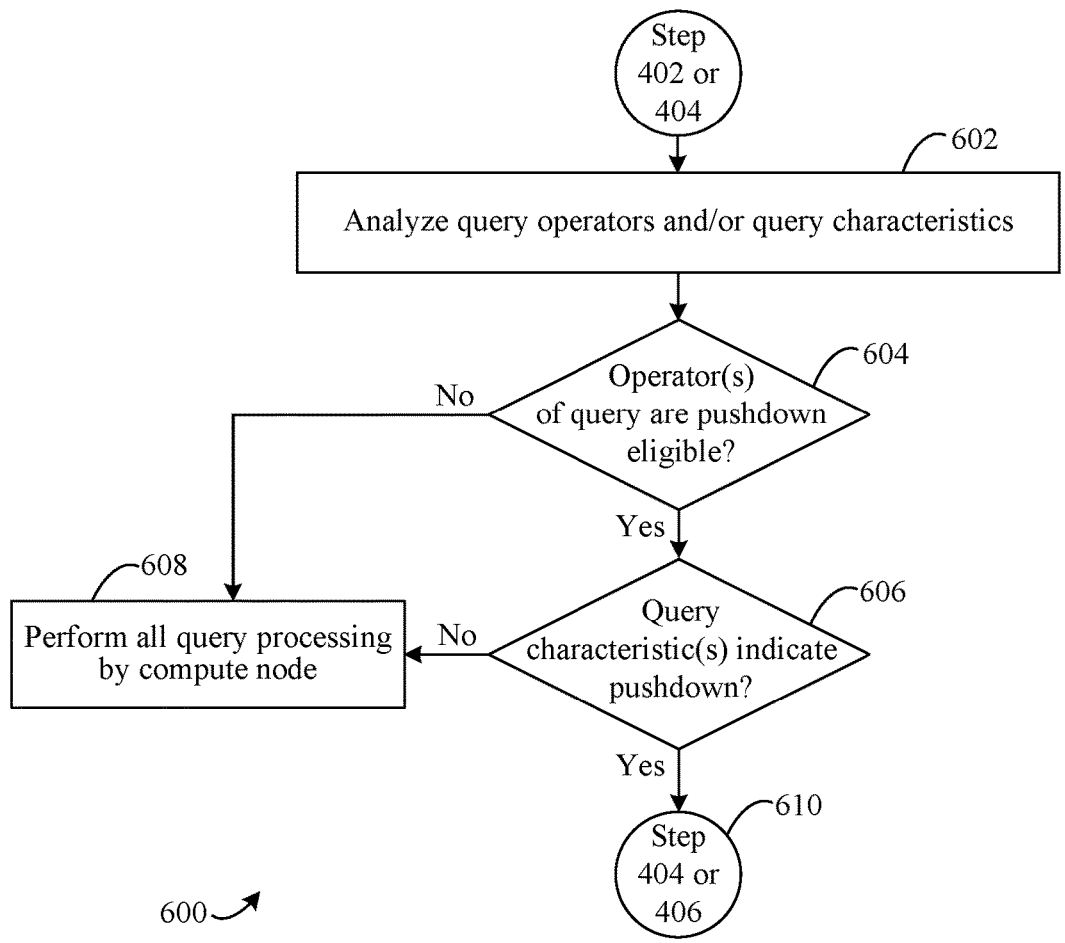
FIG. 6 shows a flow diagram for operation fragmentation with metadata serialization in query processing pushdowns, in accordance with an example embodiment.

FIG. 5A and FIG. 5B each show block diagram representations of operation fragmentation with metadata serialization in query processing pushdowns comprising a system 500A and a system 500B, respectively, and FIG. 6 shows a flow diagram 600, which may be an embodiment of flowchart 400, and which system 100A in FIG. 1A, system 100B in FIG. 1B, and/or system 200 in FIG. 2 are configured to operate in accordance with, in example embodiments for operation fragmentation with metadata serialization in query processing pushdowns.

Regarding FIG. 4, flowchart 400 begins with step 402. In step 402, a query that is directed to data stored in a database is received by a compute node of the computing system. For example, a query from a user device, service, application, or system, as described herein, is received by a compute node, such as system 200 of FIG. 2 when so configured, and/or one of compute node(s) 122 of system 100B in FIG. 1B. The query that is received may be stored in memory 206 of system 200 for analysis and/or processing. The received query may be directed to data of a database that is stored and maintained at a page server, such as system 200 of FIG. 2 when so configured, and/or one of page server(s) 124 of system 100B in FIG. 1B. The data may be stored in data pages in a storage such as storage 130 in FIG. 1B and/or storage 236 of FIG. 2, which are a portion of and/or maintained by pager server(s) 124 and computing device 202 when configured as a page server.

Referring also to FIG. 5A, system 500A is shown as an embodiment of system 100B of FIG. 1B and system 200 of FIG. 2. System 500A includes components of a compute node (e.g., page index 226 and node QP pushdown manager 232) as well as two page servers (a first page server 504 and a second page server 506) communicatively coupled to the represented compute node. In system 500A, a query 502 is exemplarily illustrated as the query of step 402 of flowchart 400 that is received by the compute node. Query 502, for illustrative purposes, is the same query as described in the example above for determining the average stock sale for transaction commissions greater than $95.00 from a database. While it should be understood that various components of system 200 such as network interface 228 are utilized in receiving a query, for brevity and illustrative clarity, in FIG. 5A, query 502 is shown as being provided to pushdown generator 214 of QP pushdown manager 232, in accordance with embodiments herein.

In step 404 of flowchart 400 in FIG. 4, one or more text fragments from the received query are generated by the compute node. A compute node, such as one of compute node(s) 122 of FIG. 1B and/or system 200 of FIG. 2 when acting as a compute node according to embodiments generates one or more query text fragments from the query received in step 402. For instance, pushdown generator 214 of system 200 is configured to analyze and parse the received query to generate text fragments thereof. That is, a query may include different operators corresponding to operations that will be performed as part of the query.

As illustrated in FIG. 5A, query 502 comprises a number of operators, data, elements, etc., as:

SELECT AVG([T_TRADE_PRICE]*[T_QTY]) AS [Average Sale Amt]
FROM [dbo].[TRADE]
WHERE [T_COMM]>95.00;

and specifies a database table "TRADE" having a values therein under a column "T_COMM" that is not the leading column of an existing index, which requires a scan of each database row in the table. In this example, pushdown generator 214 generates a query text fragment based on the query portion "WHERE [T_COMM]>95.00" that corresponds to the scanning of all table rows in the database to filter rows in which the criteria is met. As a non-limiting, illustrative example, a query text fragment may be generated here as "SELECT [T_TRADE_PRICE], [T_QTY] FROM [TRADE] WHERE [T_COMM]>95.00." In embodiments, the "WHERE" clause may be pushed to a page server(s) along with the table name and a list of columns to return, and in some embodiments, operations such as but not limited to aggregations, e.g., "SELECT SUM([T_TRADE_PRICE]* [T_QTY]), COUNT(([T_TRADE_PRICE]*[T_QTY])) FROM . . . ," evaluations of other expressions or computations, etc., may be pushed down. Simply put, it should be noted that the embodiments described herein are not limited to filtering operations, but are applicable to any types of operations for which pushdowns are enabled.

Referring again to FIG. 4, in step 406, metadata associated with the database is serialized by the compute node to generate serialized metadata. For instance, a compute node is configured to read metadata for a database from one or more page servers that maintain data pages for the database. In embodiments, metadata generator 212 in node QP pushdown manager 232 of system 200 in FIG. 2 is configured to receive and serialize the read metadata from the page servers.

In FIG. 5A, step 406 of flowchart 400 is exemplarily illustrated. System 500A of FIG. 5A is shown to include first page server 504 having first metadata 508, and second page server 506 having second metadata 510. While only two page servers and portions of metadata are shown, it should be understood that embodiments herein contemplate any number of page servers, having data pages for a database, and that maintain portions of metadata for that database. Metadata generator 212 receives first metadata 508 and second metadata 510, and aggregates and serializes first metadata 508 and second metadata 510 to generate a complete set of serialized metadata for the database being queried by query 502. That is, metadata generator 212, or another component of node QP pushdown manager 232 and/or of system 200 such as index manager 210, determines that the database table "TRADE" is specified in query 502, and thus the page servers that maintain this database, and metadata thereof, can be determined and located for collecting and serializing the metadata by metadata generator 212, as described herein. It should be noted that, in embodiments, a subset of the overall database or table metadata may be provided to a page server(s) for performing pushdown operations. For example, metadata pertaining to just the relevant table ("TRADE" in this example) may be provided, such as only for the base table and (if relevant) the index used by the query, or even only a portion of that subset of metadata (e.g., "DEFAULT" values or computed column definitions may not be included for pushdowns when not needed), etc. Embodiments also allow for changes to be made to the metadata, e.g., to remove partitioning information for partitioned tables, although metadata about each of the heaps or B-trees that comprise the partitions of a table may be sent.

It is also contemplated herein that, according to embodiments, index manager 210 as shown in FIG. 5A is configured to determine page identifiers of data pages of a database that are maintained by given page servers. That is, query 502 in this example is directed to data of database table "TRADE," which may be maintained across any number of page servers, here shown as first page server 504, second page server 506, etc. Index manager 210 is configured to determine page identifiers from page index 226 that correspond to data pages for individual page servers. In this way, operations pushed from a compute node down to a given page server may include the specific data pages maintained by that page server so that appropriate portions of the data in the database at the page server are correctly identified for the pushdown operations.

In step 408 of flowchart 400 in FIG. 4, the one or more text fragments and the serialized metadata are provided to a page server of the computing system from the compute node, the page server storing the data in at least one data page. For example, pushdown generator 214 in node QP pushdown manager 232 of system 200 is configured to provide the text fragments and serialized metadata generated according to flowchart 400, as described above, and push this data down to one or more page servers. In embodiments, page identifiers for data pages of a queried database maintained by a particular page server are also pushed from the compute node down to the page server.

Continuing with this example in reference now to FIG. 5B, it is illustrated in system 500B that pushdown generator 214 provides pushdown data 512 to first page server 504. Pushdown data includes, without limitation, the query text fragment generated in step 404 of flowchart 400 in FIG. 4 (illustratively shown as "SELECT [T_TRADE_PRICE], [T_QTY] FROM [TRADE] WHERE [T_COMM]>95.00"), the serialized metadata generated in step 406 of flowchart 400 (that include the relational metadata of the "TRADE" database), and in embodiments, the page identifiers for data pages with data of the "TRADE" database that are maintained by first page server 504, (e.g., illustrated as data 516 which includes the data pages at page server 504 for the "TRADE" database).

In 410 of flowchart 400, the one or more text fragments are compiled by the page server based on the serialized metadata to generate an executable query plan that corresponds to the query. For instance, pushdown engine 220 may be configured to generate a query plan from the query text fragments based on the serialized metadata. In embodiments, pushdown engine 220 compiles the query plan, while in other embodiments, operations processor 222 performs the compilation.

Such a query plan is illustrated in FIG. 5B as query plan 514 which is provided from pushdown engine 220 to operations processor 222. Query plan 514 includes, without limitation, query operators, expressions, other objects/data structures, etc., based on the query text fragment "SELECT [T_TRADE_PRICE], [T_QTY] FROM [TRADE] WHERE [T_COMM]>95.00" with respect to data pages at first page server 504 for the "TRADE" database.

Additionally, as illustrated in FIG. 5A and FIG. 5B, pushdown operations as described herein allow for compilation of query plans at page servers whether or not the page servers are running the same code versions or different code versions of database software than the compute node because query text is not impacted by changes to data structures. That is, the compute node represented in system 500A is running Version A database software, while first page server 504 shown in system 500B can be running either Version A or Version B (which is different from Version A).

Accordingly, embodiments herein provide for operation fragmentation with metadata serialization in query processing pushdowns in which a page server is enabled to compile an executable query plan for at least a portion of a query received by a compute node for data stored/maintained by the page server, based on query text fragments and serialized metadata, and in embodiments, page identifiers for data to be queried.

In FIG. 4, and step 412 of flowchart 400, execution of the executable query plan is initialized against the data by the page server as a pushdown query operation, and in step 414, the executable query plan is executed by the page server to generate a query result(s) that includes a portion of the data. For example, operations processor 222 of system 200 in FIG. 2 is configured to initialize the executable query plan generated in step 410 for data specified in the received query from step 402, which a page server would not be enabled to do without the embodiments described herein. Operations processor 222 then executes the query plan against the data to generate query results. As noted above, the query plan compiled/generated in step 410 may be compiled by either of pushdown engine 220 or operations processor 222, in embodiments.

Referring again to FIG. 5B, system 500B illustrates operations processor 222, having received query plan 514, performing an initialize/execute operation 515 of query plan 514 that was compiled/generated in step 410 of flowchart 400. Query plan 514 is executed against data 516, which includes the data pages at page server 504 for the "TRADE" database, according to the illustrative, exemplary embodiment shown in system 500B. The execution of query plan 514 by operations processor 222 yields or generates query results 518, which in the context of the example described herein, are the rows of data 516 for the "TRADE" database that include a value for "T_COMM" that is greater than $95.00.

Turning again to FIG. 4, in step 416 of flowchart 400, the query result is returned to the compute node from the page server. For example, with respect to FIG. 5B and system 500B, first page server 504 returns query results 518 generated by execution of query play 514 by operations processor 222 to node QP pushdown manager 232 of system 200 (i.e., to the compute node).

As noted above, in scenarios such as described herein for query 502 in which very large numbers of rows of a table in a database must be scanned to determined rows that meet a condition, e.g., "WHERE [T_COMM]>95.00," such scanning/filtering of rows can be performed at page servers where the query results returned to the compute node comprise a relatively smaller amount of data (rows) provided to the compute node than simply providing all data rows back to the compute node where the compute node performs the scanning/filtering operation. This also utilizes memory and processing resources available at page servers rather than further burdening the resources at the compute node which must handle many other operations. Embodiments herein contemplate pushdown operations being provided to a single page server, as well as, pushdown operations being provided to two or more page servers when data of a database is maintained in data pages across multiple page servers. In such embodiments for multiple page servers, each page server may receive a similar or the same query text fragment and serialized metadata, while receiving page identifiers of data pages specific to the page servers. Moreover, the division of operations over multiple page servers improves the time to complete query operations over utilizing a compute node alone.

Referring now to FIG. 6, in view of FIG. 4 and FIG. 5A, flow diagram 600 begins subsequent to step 402 or step 404 of flowchart 400, in embodiments. Flow diagram 600 illustrates determinations made by a compute node, when receiving a query, regarding the pushing of query operations down to a page server.

For example, in step 602 of flow diagram 600, query operators and/or query characteristics are analyzed. For instance, a compute node may be configured to analyze query operators and query characteristics to identify indicia of pushdown operations being possible and/or beneficial, according to embodiments. As an example, pushdown generator 214 of system 200 in FIG. 2, also illustrated in FIG. 5A, may be configured to analyze incoming queries, such as the received query in step 402 of flowchart 400 in FIG. 4 and query 502 in system 500A of FIG. 5A. Individual, or combinations of, query operators may be identified by such analysis at the compute node to determine if an incoming query includes operators that are eligible, or candidates, for pushdown operations at a page server. While not so limited, as would be understood by persons of skill in the relevant art(s) having the benefit of this disclosure, operators such as those requiring a scan of a table, conditional operators (e.g., where column data is compared to a value: "WHERE [T_COMM]>95.00," "SELECT [T_TRADE_PRICE], [T_QTY] FROM [TRADE] WHERE [T_COMM]>95.00," etc.), and/or the like, may be eligible.

Query characteristics may include, without limitation, a size of data in a database to which a query is directed, a number of rows in a table of the database, a number of page servers that maintain the data in the database (i.e., a number of I/O operations required), visibility of columns to be queried (e.g., index availability), and/or the like. Query characteristics such as large databases, large numbers of rows, multiple page servers that maintain the data/large numbers of I/O operations, lack of data column visibility in a page index, etc., are indicia of pushdown operations being beneficial for system performance efficiency, alleviation of resource burdens, and network bandwidth reductions.

Once query operators and query characteristics are analyzed by the compute node in step 602, flow diagram 600 continues to step 604 where it is determined if a query operator(s) is identified that is pushdown-eligible, as described above. If no operator is identified by the compute node, flow diagram 600 proceeds to step 608 in which query processing is performed by the compute node as a regular operation without pushdowns. If an operator is identified by the compute node, flow diagram 600 proceeds to step 606. In step 606, is determined if a query characteristic(s) is identified that indicates a pushdown should be performed, as described above. If no characteristic is identified by the compute node, flow diagram 600 proceeds to step 608; however, if a characteristic is identified by the compute node, flow diagram 600 proceeds from step 606 to step 404 or step 406 of flowchart 400 of FIG. 4.

It should be noted that the performance of steps for flow diagram 600, from a temporal standpoint, is not fixed, and may begin before, during, or after step 404 of flowchart 400, and may end before, during, or after step 406 of flowchart 400, in various embodiments herein. Additionally, in some embodiments, one of step 604 or step 606 may not be performed for flow diagram 600, while in other embodiments, the steps of flow diagram 600 may be optional with respect to the operation of flowchart 400.

It is also contemplated herein that system characteristics of compute nodes may be utilized in determinations for pushing query operations down to a page server. For instance, a computational or memory burden at a compute node favors pushdown operations, as do large numbers of operations being performed by a compute node. I/O bandwidth utilization is another compute node characteristic that, when high, favors utilizing pushdown operations.

Figure 7:
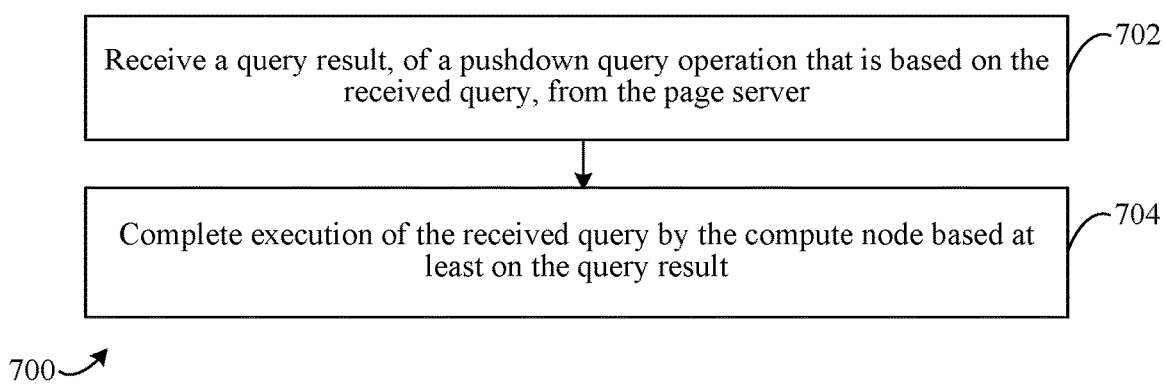
FIG. 7 shows a flowchart for operation fragmentation with metadata serialization in query processing pushdowns, in accordance with an example embodiment.

FIG. 7 will now be described. In embodiments, as noted above, results of QP pushdown operations based on operation fragmentation with metadata serialization may be provided from page servers to a compute node. In such cases, the compute node may be configured to utilize the results to perform additional operations of a received query associated with the pushdown operations.

In FIG. 7, a flowchart 700 is shown for operation fragmentation with metadata serialization in query processing pushdowns, according to an example embodiment. System 100A in FIG. 1A, system 100B in FIG. 1B, system 200 in FIG. 2, system 500A of FIG. 5A, and/or system 500B of FIG. 5B are configured to operate according to flowchart 700. Further structural and operational examples will be apparent to persons skilled in the relevant art(s) based on the following descriptions. Flowchart 700 may be an embodiment of flowchart 400 in FIG. 4, and is described below in the context of system 200 of FIG. 2, system 500A of FIG. 5A, and system 500B in FIG. 5B. It should be understood, however, the following description is also applicable to system 100A in FIG. 1A.

Flowchart 700 begins at step 702. In step 702, a query result of a pushdown query operation that is based on the received query is received from the page server. For example, the query result provided in step 416 of flowchart 400 from the page server (e.g., one of page server(s) 124 of FIG. 1B, system 200 of FIG. 2, when so configured, and/or first page server 504 in system 500B of FIG. 5B) is received at the compute node (e.g., one of compute node(s) 122 of FIG. 1B, system 200 of FIG. 2, when so configured, and/or pushdown generator 214 of a compute node in system 500B of FIG. 5B). The received result(s) is stored in memory by the compute node to be utilized in completing the received query (e.g., from step 402 of flowchart 400 and/or as shown for query 502 in system 500A of FIG. 5A). In continuation of the example for query 502 described herein, query results 518 in system 500B include at least a portion of the 245,598 rows in the database table "TRADE" where the commission "T_COMM" is higher than $95.00. In embodiments for which pushdown operations associated with query 502 are provided to multiple page servers, the compute node, e.g., via pushdown generator 214, is configured to aggregate the results from the different page servers (i.e., other portions of 245,598 rows) as an overall pushdown query result.

In step 704, execution of the received query is completed by the compute node based at least on the query result. For instance, a compute node as defined herein may perform QP operations for a received query based on data that is returned from page servers for pushdown operations associated with the received query. In embodiments, pushdown generator 214 may provide the query result(s) or the overall pushdown query result, as described above for step 702, to an operations processor (e.g., operations processor 222 in system 200 of FIG. 2), to complete QP operations for the received query. In the example described for query 502 of FIG. 5A, the returned query results of the pushdown operation(s) that include the rows of data from the table "TRADE" in the database where "T_COMM" is greater than $95.00 are provided to operations processor 222 which may compile/generate a query plan for "SELECT AVG([T_TRADE_PRICE]*[T_QTY]) AS [Average Sale Amt]" based on the returned rows, and then execute the query plan to determine value of "[Average Sale Amt]" for the returned rows.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100A in FIG. 1A, system 100B in FIG. 1B, system 200 in FIG. 2, system 500A of FIG. 5A, and/or system 500B of FIG. 5B, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

FIG. 8 depicts an exemplary implementation of a computing device 800 in which embodiments may be implemented. For example, embodiments described herein may be implemented in one or more computing devices or systems similar to computing device 800, or multiple instances of computing device 800, in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, servers, and/or clusters, etc., as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing embodiments described herein, such as but not limited to system 100A in FIG. 1A, system 100B in FIG. 1B, system 200 in FIG. 2, system 500A of FIG. 5A, and/or system 500B of FIG. 5B, along with any components and/or subcomponents thereof, as well as the flowcharts/flow diagrams described herein, including portions thereof, and/or further examples described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

TPM 854 may be connected to bus 806, and may be an embodiment of any TPM, as would be understood by one of skill in the relevant art(s) having the benefit of this disclosure. For example, TPM 854 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including memory 820 of FIG. 8). Such computer program media, computer-readable storage devices, computer-readable media, and/or computer-readable storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for operation fragmentation with metadata serialization in query processing pushdowns. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The embodiments herein also include distinguishing aspects over distributed query processing systems. For example, in distributed query processing, metadata is stored on remote or linked servers and is fetched or read by a primary compute node when needed for compilation of queries. Thus, any remoted queries can be delegated without shipping any metadata back to the remote server because the metadata is already present and maintained there. In contrast, the embodiments herein account for metadata that is read on the compute node where individual pages may be stored on each page server, but no single page server has the complete set of metadata for the database. According to the described embodiments, a complete set of metadata is serialized at the compute node and is provided to the page servers for the purpose of enabling compilation and execution of the pushed-down query operations by page servers.

According to the described embodiments for operation fragmentation with metadata serialization in query processing pushdowns, solutions are provided with unique components and configurations to improve processing loads and efficiency in systems of compute nodes and page servers, reduce memory pressure at compute nodes, and greatly reduce network bandwidth usage and I/O operations between compute nodes and page servers, while also providing faster times to complete operations, e.g., via pushdown operations, that were previously not available for software-based services, much less for the specific embodiments described herein for compute nodes and associated page servers. Accordingly, improved query performance for analytical queries against large data sets are realized by the described embodiments.

The additional examples and embodiments described in this Section may be applicable to examples disclosed in any other Section or subsection of this disclosure.

Embodiments in this description provide for systems, devices, and methods for operation fragmentation with metadata serialization in query processing pushdowns. For example, a method performed by a computing system in which query operations are pushed from a compute node down to a page server is described. The method includes receiving, by a compute node of the computing system, a query that is directed to data stored in a database; generating, by the compute node, one or more text fragments from the received query; serializing, by the compute node, metadata associated with the database to generate serialized metadata; providing, to a page server of the computing system from the compute node, the one or more text fragments, and the serialized metadata, the page server storing the data in at least one data page; compiling, by the page server, the one or more text fragments based on the serialized metadata to generate an executable query plan that corresponds to the query; and initializing execution of the executable query plan against the data by the page server as a pushdown query operation.

In an embodiment, the method includes receiving a first portion of the metadata by the compute node from the page server; and receiving a second portion of the metadata by the compute node from another page server of the computing system, where serializing includes serializing the first portion and the second portion to generate the serialized metadata.

In an embodiment, the method includes analyzing at least one of operations or characteristics of the received query by the compute node; and prior to said generating or said serializing, performing at least one of: determining by the compute node that at least one portion of the query is eligible as the pushdown query operation; or determining, based on at least one characteristic of the query, to push the at least one portion of the query down to the page server.

In an embodiment, the method includes executing the executable query plan by the page server to generate a query result that includes a portion of the data; and returning the query result to the compute node from the page server.

In an embodiment of the method, the compute node and the page server execute different code versions respectively for applying queries against the database.

In an embodiment, the method includes identifying from a page index, by the compute node, at least one data page identifier respectively corresponding to the at least one data page; where providing includes providing the at least one data page with the one or more text fragments and the serialized metadata.

In an embodiment of the method, the one or more text fragments correspond to a filter operation or an aggregation operation of the query; or the metadata comprises relational data from a table of the database.

A system is also described herein. The system may be configured and enabled in various ways for operation fragmentation with metadata serialization in query processing pushdowns, as described herein. In an embodiment, the system includes a memory that stores program instructions, and a processing system configured to execute the program instructions. The program instructions cause the processing system to receive, by a compute node of the computing system, a query that is directed to data stored in a database; generate, by the compute node, one or more text fragments from the received query; serialize, by the compute node, metadata associated with the database to generate serialized metadata; provide, to a page server of the computing system from the compute node, the one or more text fragments, and the serialized metadata, the page server storing the data in at least one data page; compile, by the page server, the one or more text fragments based on the serialized metadata to generate an executable query plan that corresponds to the query; and initialize execution of the executable query plan against the data by the page server as a pushdown query operation.

In an embodiment of the system, the program instructions cause the processing system to receive a first portion of the metadata by the compute node from the page server; and receive a second portion of the metadata by the compute node from another page server of the computing system; where to serialize the metadata includes to serialize the first portion and the second portion to generate the serialized metadata.

In an embodiment of the system, the program instructions cause the processing system to analyze at least one of operations or characteristics of the received query by the compute node; and prior to said generate or said serialize, perform at least one of: determine by the compute node that at least one portion of the query is eligible as the pushdown query operation; or determine, based on at least one characteristic of the query, to push the at least one portion of the query down to the page server.

In an embodiment of the system, the program instructions cause the processing system to: execute the executable query plan by the page server to generate a query result that includes a portion of the data; and return the query result to the compute node from the page server.

In an embodiment of the system, the compute node and the page server execute different code versions respectively for applying queries against the database.

In an embodiment of the system, the program instructions cause the processing system to: identify from a page index, by the compute node, at least one data page identifier respectively corresponding to the at least one data page; where to provide includes to provide the at least one data page with the one or more text fragments and the serialized metadata.

In an embodiment of the system, the one or more text fragments correspond to a filter operation or an aggregation operation of the query; or the metadata includes relational data from a table of the database.

A computer-readable storage medium having program instructions recorded thereon that are configured to cause a processing system that executes the program instructions to perform operations and functions is also described. The program instructions are for operation fragmentation with metadata serialization in query processing pushdowns. The program instructions cause the processing system that executes the program instructions to receive, by a compute node of the computing system, a query that is directed to data stored in a database; generate, by the compute node, one or more text fragments from the received query; serialize, by the compute node, metadata associated with the database to generate serialized metadata; provide, to a page server of the computing system from the compute node, the one or more text fragments, and the serialized metadata, the page server storing the data in at least one data page; compile, by the page server, the one or more text fragments based on the serialized metadata to generate an executable query plan that corresponds to the query; and initialize execution of the executable query plan against the data by the page server as a pushdown query operation.

In an embodiment of the computer-readable storage medium, the program instructions cause the processing system that executes the program instructions to receive a first portion of the metadata by the compute node from the page server; and receive a second portion of the metadata by the compute node from another page server of the computing system; where to serialize the metadata includes to serialize the first portion and the second portion to generate the serialized metadata.

In an embodiment of the computer-readable storage medium, the program instructions cause the processing system that executes the program instructions to analyze at least one of operations or characteristics of the received query by the compute node; and prior to said generate or said serialize, perform at least one of: determine by the compute node that at least one portion of the query is eligible as the pushdown query operation; or determine, based on at least one characteristic of the query, to push the at least one portion of the query down to the page server.

In an embodiment of the computer-readable storage medium, the program instructions cause the processing system that executes the program instructions to execute the executable query plan by the page server to generate a query result that includes a portion of the data; and return the query result to the compute node from the page server.

In an embodiment of the computer-readable storage medium, the program instructions cause the processing system that executes the program instructions to identify from a page index, by the compute node, at least one data page identifier respectively corresponding to the at least one data page; where to provide includes to provide the at least one data page with the one or more text fragments and the serialized metadata.

In an embodiment of the computer-readable storage medium, the compute node and the page server execute different code versions respectively for applying queries against the database; the one or more text fragments correspond to a filter operation or an aggregation operation of the query; or the metadata comprises relational data from a table of the database.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method performed by a computing system in which query operations are pushed from a compute node, which is processor-based, down to a page server, which is processor-based, of a plurality of distributed page servers, the method comprising:
   receiving, by the compute node of the computing system, a query that is directed to data stored in a database, the compute node being designated to execute queries in the computing system;
   determining an operation of the received query that returns a first amount of data from the page server to the compute node when executed by the compute node;
   generating, by the compute node, one or more text fragments from the received query corresponding to the operation;
   serializing, by the compute node, metadata associated with the database to generate serialized metadata;
   providing, to the page server of the computing system from the compute node, the one or more text fragments and the serialized metadata, enabling the page server to perform the operation, the page server storing the data in at least one data page;
   compiling, by the page server, the one or more text fragments based on the serialized metadata to generate an executable query plan that corresponds to the query; and
   executing the executable query plan against the data by the page server as a pushdown query operation that returns a second amount of data that is less than the first amount of data to the compute node.

2. The method of claim 1, further comprising:
   receiving a first portion of the metadata by the compute node from the page server; and
   receiving a second portion of the metadata by the compute node from another page server of the computing system;
   wherein said serializing comprises serializing the first portion and the second portion to generate the serialized metadata.

3. The method of claim 1, further comprising:
   analyzing at least one of operations or characteristics of the received query by the compute node; and
   prior to said generating or said serializing, performing at least one of:
      determining by the compute node that at least one portion of the query is eligible as the pushdown query operation; or
      determining, based on at least one characteristic of the query, to push the at least one portion of the query down to the page server.

4. The method of claim 1, further comprising:
   executing the executable query plan by the page server to generate a query result that includes a portion of the data; and
   returning the query result to the compute node from the page server.

5. The method of claim 1, wherein the compute node and the page server execute different code versions respectively for applying queries against the database.

6. The method of claim 1, further comprising:
   identifying from a page index, by the compute node, at least one data page identifier respectively corresponding to the at least one data page;
   wherein said providing includes providing the at least one data page identifier with the one or more text fragments and the serialized metadata.

7. The method of claim 1, wherein the one or more text fragments correspond to a filter operation or an aggregation operation of the query; or
   wherein the metadata comprises relational data from a table of the database.

8. A computing system that comprises:
   a memory that stores program instructions; and
   a processing system configured to execute the program instructions that cause the processing system to:
      receive, by a compute node, which is processor-based, of the computing system, a query that is directed to data stored in a database, the compute node being designated to execute queries in the computing system;
      determine an operation of the received query that returns a first amount of data from a page server, which is processor-based, to the compute node when executed by the compute node;
      generate, by the compute node, one or more text fragments from the received query corresponding to the operation;
      serialize, by the compute node, metadata associated with the database to generate serialized metadata;
      provide, to the page server of the computing system from the compute node, the one or more text fragments and the serialized metadata, enabling the page server to perform the operation, the page server storing the data in at least one data page;

compile, by the page server, the one or more text fragments based on the serialized metadata to generate an executable query plan that corresponds to the query; and execute the executable query plan against the data by the page server as a pushdown query operation that returns a second amount of data that is less than the first amount of data to the compute node.

9. The system of claim 8, wherein the program instructions cause the processing system to:

receive a first portion of the metadata by the compute node from the page server; and receive a second portion of the metadata by the compute node from another page server of the computing system;

wherein to serialize the metadata includes to serialize the first portion and the second portion to generate the serialized metadata.

10. The system of claim 8, wherein the program instructions cause the processing system to:

analyze at least one of operations or characteristics of the received query by the compute node; and prior to said generate or said serialize, perform at least one of:

determine by the compute node that at least one portion of the query is eligible as the pushdown query operation; or determine, based on at least one characteristic of the query, to push the at least one portion of the query down to the page server.

11. The system of claim 8, wherein the program instructions cause the processing system to:

execute the executable query plan by the page server to generate a query result that includes a portion of the data; and return the query result to the compute node from the page server.

12. The system of claim 8, wherein the compute node and the page server execute different code versions respectively for applying queries against the database.

13. The system of claim 8, wherein the program instructions cause the processing system to:

identify from a page index, by the compute node, at least one data page identifier respectively corresponding to the at least one data page;

wherein said provide includes to provide the at least one data page identifier with the one or more text fragments and the serialized metadata.

14. The system of claim 8, wherein the one or more text fragments correspond to a filter operation or an aggregation operation of the query; or wherein the metadata comprises relational data from a table of the database.

15. A computer-readable storage medium having program instructions recorded thereon that are configured to cause a processing system that executes the program instructions to:

receive, by a compute node, which is processor-based, of the computing system, a query that is directed to data stored in a database, the compute node being designated to execute queries in the computing system;

determine an operation of the received query that returns a first amount of data from a page server, which is processor-based, to the compute node when executed by the compute node;

generate, by the compute node, one or more text fragments from the received query corresponding to the operation;

serialize, by the compute node, metadata associated with the database to generate serialized metadata;

provide, to the page server of the computing system from the compute node, the one or more text fragments and the serialized metadata, enabling the page server to perform the operation, the page server storing the data in at least one data page;

compile, by the page server, the one or more text fragments based on the serialized metadata to generate an executable query plan that corresponds to the query; and execute the executable query plan against the data by the page server as a pushdown query operation that returns a second amount of data that is less than the first amount of data to the compute node.

16. The computer-readable storage medium of claim 15, wherein the program instructions are further configured to cause the processing system that executes the program instructions to:

receive a first portion of the metadata by the compute node from the page server; and receive a second portion of the metadata by the compute node from another page server of the computing system;

wherein to serialize the metadata includes to serialize the first portion and the second portion to generate the serialized metadata.

17. The computer-readable storage medium of claim 15, wherein the program instructions are further configured to cause the processing system that executes the program instructions to:

analyze at least one of operations or characteristics of the received query by the compute node; and prior to said generate or said serialize, perform at least one of:

determine by the compute node that at least one portion of the query is eligible as the pushdown query operation; or determine, based on at least one characteristic of the query, to push the at least one portion of the query down to the page server.

18. The computer-readable storage medium of claim 17, wherein the program instructions are further configured to cause the processing system that executes the program instructions to:

execute the executable query plan by the page server to generate a query result that includes a portion of the data; and return the query result to the compute node from the page server.

19. The computer-readable storage medium of claim 18, wherein the program instructions are further configured to cause the processing system that executes the program instructions to:

identify from a page index, by the compute node, at least one data page identifier respectively corresponding to the at least one data page;

wherein said provide includes to provide the at least one data page identifier with the one or more text fragments and the serialized metadata.

20. The computer-readable storage medium of claim 15, wherein the compute node and the page server execute different code versions respectively for applying queries against the database;

wherein the one or more text fragments correspond to a filter operation or an aggregation operation of the query; or wherein the metadata comprises relational data from a table of the database.

* * * * *